United States Patent [19]

Scott

[11] 4,340,244
[45] Jul. 20, 1982

[54] CLIP FOR SLIP-JOINT TUBE CONNECTIONS

[76] Inventor: Kenneth W. Scott, 601 Ninth St., Coronado, Calif. 92118

[21] Appl. No.: 189,377

[22] Filed: Sep. 22, 1980

[51] Int. Cl.³ ............................................. F16L 33/20
[52] U.S. Cl. ..................................... 285/8; 285/114; 285/340; 285/DIG. 3; 24/339
[58] Field of Search ................. 285/114, 340, DIG. 3, 285/82, 81, 420, 8; 24/339, 261 R

[56] References Cited

U.S. PATENT DOCUMENTS

| 770,982 | 9/1904 | Plassmann | 285/114 |
| 874,378 | 12/1907 | Allen | 285/114 |
| 883,220 | 3/1908 | Middlebrook | 285/114 |
| 1,532,549 | 4/1925 | Ransiev | 285/114 |
| 2,205,496 | 6/1940 | Schneider | 24/339 X |
| 2,461,427 | 2/1949 | Kneebone | 285/DIG. 3 X |
| 2,642,108 | 6/1953 | Geistert | 285/81 X |
| 3,874,713 | 4/1975 | Myers | 285/340 |
| 3,881,753 | 5/1975 | Bochory | 285/82 |
| 4,230,109 | 10/1980 | Geiss | 285/114 X |

FOREIGN PATENT DOCUMENTS

| 498350 | 12/1953 | Canada | 285/DIG. 3 |
| 2158816 | 7/1972 | Fed. Rep. of Germany | 285/340 |
| 2830799 | 1/1980 | Fed. Rep. of Germany | 285/DIG. 3 |
| 719536 | 12/1954 | United Kingdom | 24/339 |

Primary Examiner—Thomas F. Callaghan
Attorney, Agent, or Firm—Ralph S. Branscomb

[57] ABSTRACT

A clip and method of using same are provided whereby the angle valve beneath the sink is positively coupled to the flexible connector tube leading to the faucet to prevent the tube from working out of the slip-joint of the angle valve over a period of time.

1 Claim, 6 Drawing Figures

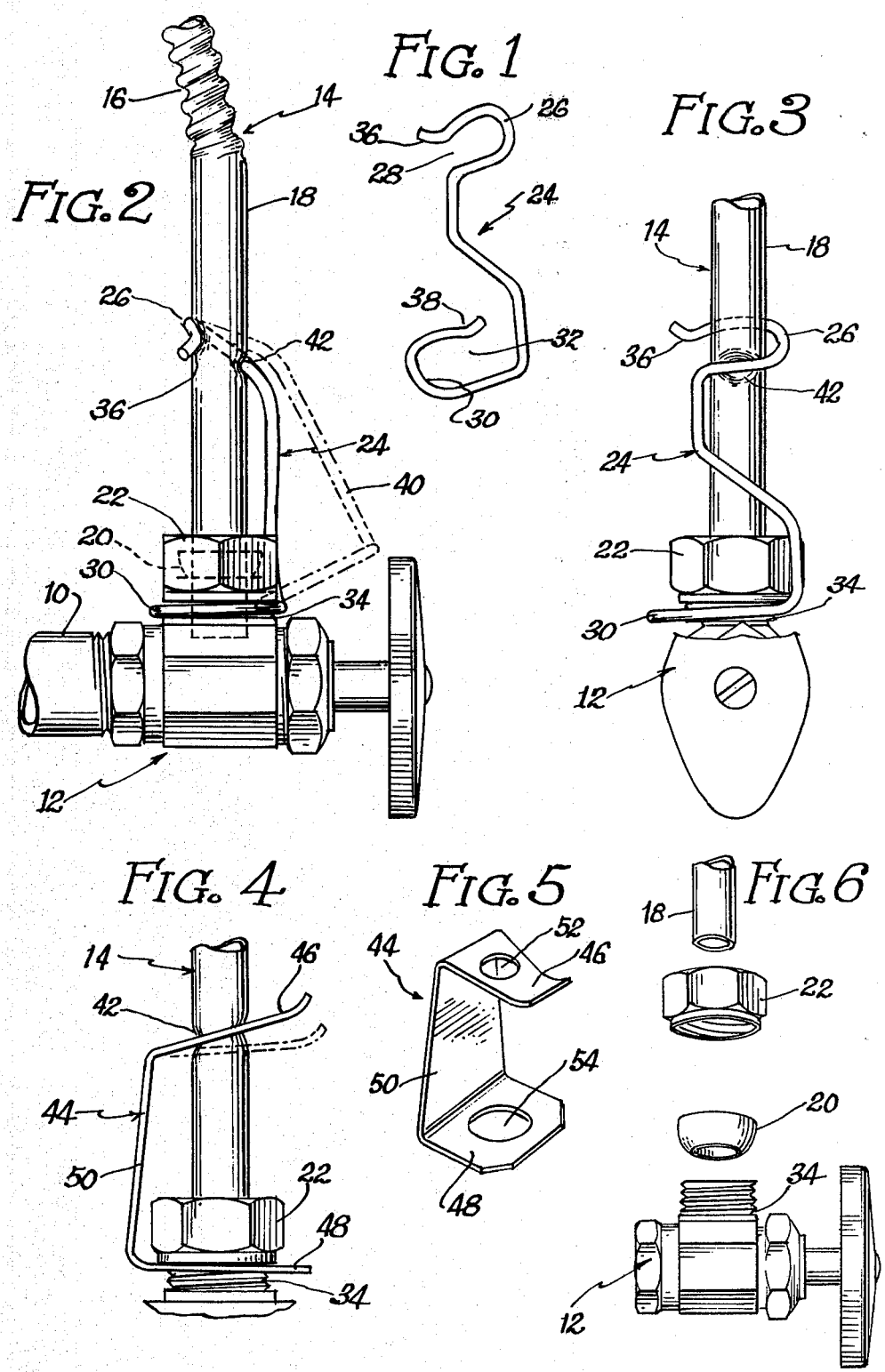

CLIP FOR SLIP-JOINT TUBE CONNECTIONS

BACKGROUND

Beneath most sinks the plumbing leading to the hot and cold water supplies is roughed out in the form of stub pipes projecting perpendicularly from the wall beneath the sink. These pipes are connected to the faucets of the sink by what are known as angle valves threaded onto the stub pipes and connector tubes leading from the angle valve up to the faucet fitting.

Typically the angle valves utilize a frictional connector to engage the connector tube comprising a compression nut which expands a resilient bushing when tightened to grip the inserted connector tube. The connector tube traditionally was made of copper tubing, which could be manually bent to the geometry needed to connect the valves with the faucets.

Because it is somewhat difficult and time-consuming to bend the conventional copper tubing to the proper configuration recently a flexible connector tube has been brought into virtually universal use. This tube has a large length which is provided with helical convolutions making it much easier to bend and reducing the time of installation considerably. However, despite the advantage of time saving inherent in the utilization of the flexible connector tube, it is accompanied by a major drawback. Whereas while the stiff, smooth-surfaced copper tubing would remain in the slip joint at the angle valve indefinitely, the flexible connector tube has a tendency to work out of the slip joint over a period of time. This is both because the tube is more flexible and because the convolutions offer more water resistance and make the tube more susceptible to air hammer and gradual displacement of the tube due to fluid friction.

Although ordinarily a leak will develop as the tube more and more closely approaches being free of the slip joint, occasionally it pops free without previous notice. Clearly the results of this can be catastrophic, especially if the tenents are not home and the unit is in an apartment building where the unchecked water flow can damage multiple units before the situation is corrected.

However, inasmuch as the time savings are so significant in installation, and because plumbers are generally in a considerable hurry, there is no likelihood that standard copper tubing will be resumed for use in this application, and there is therefore a need for a simple means of positively locking the tube into the slip joint of the angle valve, and preferably a means which can be retrofitted onto existing units.

SUMMARY

The present invention fulfills the above-stated need and comprises a clip which may be in the form of a contoured resilient wire or a shaped piece of string spring steel or plastic. The basic concept of the clip is to provide a resilient body which defines two apertures, either open or closed, the first of which defines an axis that passes eccentrically of the second aperture so that the first aperture can be engaged over the tube and when the second aperture is brought over the neck of the slip joint, the first aperture will pinch the tube, making slight dents in the opposite sides of the tube so that the coupling is positive.

BRIEF DESCRIPTION OF THE DRAWINGS

FIG. 1 is a perspective view of the clip;
FIG. 2 is a side elevation view of the clip in use;
FIG. 3 is a view from the right end of FIG. 2 with part of the valve knob cut away to reveal the clip;
FIG. 4 is a side elevation view of a modified clip;
FIG. 5 is a perspective view of the clip of FIG. 4;
FIG. 6 is an exploded view of the slip joint of the angle valve and the flex tube.

DETAILED DESCRIPTION OF THE PREFERRED EMBODIMENTS

A typical sub-sink plumbing arrangement is shown in FIG. 2 wherein the stub pipe 10 projecting from the wall enters a slip-joint angle valve 14 which is internally threaded to screw over the stub pipe 10. A flexible connector tube 14 has a convoluted helical portion 16 which makes the tube easy to bend and a smooth lower portion 18 which connects to the angle valve.

This connection is effected by a slip-joint constituting resilient bushing 20 and compression nut 22. The smooth end 18 of the tubing is inserted through the bushing, and the compression nut 22 is tightened to secure the tube smoothly, but only frictionally rather than positively inasmuch as there is no flange or other projection at the bottom end of the flexible connector tube.

Although the connector tube would be free to move up on the order of $\frac{3}{8}''$ before it even began to exit the compression bushing, the constant upward force on the tubing due to air hammer and normal fluid friction tends to bring the tubing partially out of the bushing, and occasionally completely free of the angle valve.

The first embodiment of the clip utilized to solve this problem is shown in FIG. 1 wherein it is seen that the body of the clip comprises a bent wire 24 having a top loop 26 defining an open aperture 28 and a bottom loop 30 defining an open aperture 32.

In this embodiment, because the apertures are open, the clip may be snapped first over the tubing and then around the neck 34 of the valve as shown in FIGS. 2 and 3. The open loops 26 and 30 open in directions that are generally parallel to one another and the loops define an inward bend at 36 and 38 respectively. The shape of the wire is such that when the clip is loosely placed over the tube it will hang down as shown in dotted line at 40. By forcing the bottom loop around the neck, two things happen. First, the tube is slightly crimped or dented as at 42, and secondly, because the wire is resilient, there is a bias on the lower loop which, because of its orientation and the bend 38, positively secures the loop on the valve neck. The geometrical criterion for achieving this result is that the axis of the aperture 28 not pass through the center of aperture 32.

It should be noted that it would also be possible to bend the wire such that the apertures opened in the same, rather than the opposite direction. In any event, it can be seen that in order to work properly the diameter of the top aperture 28 should be only slightly greater than the flexible tubing so that it will crimp it as the bottom portion is drawn around the neck of the valve. Although the bend 38 of the bottom loop will prevent it from snapping out radially away from the tube regardless of the diameter of the lower aperture 32, in order to provide a positve opposition to axial movement of the tube out of the slip-joint, the diameter of the lower aperture should be less than that of the compression nut 22. The size of the clip might vary somewhat inasmuch as the flexible connector tube 14 comes in several sizes.

A modification is shown in FIGS. 4 and 5 wherein a formed leaf spring-type clip 44 defines top and bottom stages 46 and 48 and an upright connector portion 50. The apertures 52 and 54, being closed, require that this embodimen be installed when the tube and valve are disassembled. Positive engagement of the tube is effected by virtue of the downward slant of the top stage 46 in its natural position shown in FIG. 5 on the upward slant of the stage 46 in the embodiment of FIG. 4.

For installation, this stage is displaced to the horizontal position outlined in dotted line at 56 in FIG. 4, and then allowed to snap back under its internal spring tension once the tube has been installed. The upward slant of the stage 46 of FIG. 4 causes a desirable pinching effect on the tube once the clip is installed. Upward force on the tube causes the clip to dig into the tube more tightly.

The embodiment of FIGS. 4 and 5 could be made either of metal or plastic, and it could also clearly be modified to serve as a retrofit unit by opening the apertures 52 and 54 to the outside to achieve the same effect as the open apertures of the wire embodiment.

Although the clip and its method of use are shown here in a sub-sink angle valve environment, it is not intended to be so limited and would work equally well in any situation in which a tube is retained in a slip-joint. According to some methods of installation under the sink, a positive connection is made between the flexible tube and the angle valve, and the slip-joint connection is made at the top of the flexible tube where it connects to the faucet. In this instance, the clip is used upside down, but otherwise in the same manner and with the same result as disclosed herein.

What is claimed is:

1. A clip for coupling a tube in a slip-joint retained by a compression nut on a neck without requiring dismantling of the slip-joint comprising:

a resilient unitary wire body defining a first open loop of effective diametric dimension slightly smaller than said tube to cause deformation of said tube in use, and a second open loop of diameter slightly greater than said neck and less than that of said nut, the axis of said first loop passing eccentrically of said second loop, whereby said first loop can be engaged on said tube coaxially and angled to grip said tube when said second loop is engaged on said neck by said nut;

said loops being open in substantially parallel directions and the opening of said second open loop is resilient and narrower than the diameter of said neck to permit engaging said first loop around said tube and snapping said second loop around said neck subsequent to assembly of said tube and slip-joint to positively retain said clip on said neck.

* * * * *